US009863425B2

(12) United States Patent
Kallesoe et al.

(10) Patent No.: US 9,863,425 B2
(45) Date of Patent: Jan. 9, 2018

(54) PUMP SYSTEM (71) Applicant: Grundfos Holding, Bjerringbro (DK)

(72) Inventors: Carsten Skovmose Kallesoe, Viborg (DK); Abdul-Sattar Hassan, Ega (DK)

(73) Assignee: Grundfos Holding a/s, Bjerringbro (DK)

( * ) Notice: Subject to any disclaimer, the term of this patent is extended or adjusted under 35 U.S.C. 154(b) by 499 days.

(21) Appl. No.: 14/202,199

(22) Filed: Mar. 10, 2014

(65) Prior Publication Data
US 2014/0255216 A1 Sep. 11, 2014

(30) Foreign Application Priority Data

Mar. 11, 2013 (EP) .................................... 13158602

(51) Int. Cl.
*F04D 15/00* (2006.01)
*E03B 7/02* (2006.01)
(Continued)

(52) U.S. Cl.
CPC ............ *F04D 15/0066* (2013.01); *E03B 1/00* (2013.01); *E03B 1/02* (2013.01); *E03B 7/02* (2013.01);
(Continued)

(58) Field of Classification Search
CPC ... E03B 1/00; E03B 1/02; E03B 7/075; E03B 7/02; E03B 7/071; F04D 15/0066;
(Continued)

(56) References Cited

U.S. PATENT DOCUMENTS

| 6,178,393 B1* | 1/2001 | Irvin | ................... F04D 15/0066 700/282 |
| 2002/0096219 A1* | 7/2002 | Frasure | ............... F04D 15/0066 137/565.13 |

(Continued)

FOREIGN PATENT DOCUMENTS

| CN | 102677740 A | 9/2012 |
| CN | 102884407 A | 1/2013 |

(Continued)

OTHER PUBLICATIONS

Office Action dated Mar. 30, 2016 in CN Application No. 201410088402.
(Continued)

*Primary Examiner* — Dominick L Plakkoottam
(74) *Attorney, Agent, or Firm* — Panitch Schwarze Belisario & Nadel LLP (57) ABSTRACT A pump system for a water supply mains has at least one pump device, a pressure detecting sensor at the pressure side of the pump device, a flow detecting sensor of the pump device, several pressure sensor units (D) remote arranged remotely from the pump device in different part regions of the mains, and a pump control device. The control device includes a model formation module designed in each case to produce a model (A) representing pressure loss from the pressure sensor to the position of the respective pressure sensor unit (D), based on several pressure measured values of at least two pressure sensor units (D) for the at least two associated part regions. The control device is designed for regulation of the pump device based on produced models (A), as well as to a corresponding method for regulation of a pump device in a water supply mains.

11 Claims, 5 Drawing Sheets

(51) Int. Cl.
*E03B 1/00* (2006.01)
*E03B 1/02* (2006.01)
*E03B 7/07* (2006.01)
*G05D 16/20* (2006.01)

(52) U.S. Cl.
CPC .......... *E03B 7/071* (2013.01); *G05D 16/2066* (2013.01); *Y10T 137/0318* (2015.04); *Y10T 137/0396* (2015.04); *Y10T 137/8158* (2015.04)

(58) Field of Classification Search
CPC ............. F04D 15/0227; G01M 3/2815; G05D 16/2066; Y10T 137/0318; Y10T 137/8158; Y10T 137/8593
See application file for complete search history.

(56) References Cited

U.S. PATENT DOCUMENTS

| | | | |
|---|---|---|---|
| 2010/0168927 A1* | 7/2010 | Burrows | E03B 1/00 700/282 |
| 2011/0290331 A1* | 12/2011 | Burrows | E03B 7/02 137/14 |
| 2013/0289781 A1* | 10/2013 | Kallesoe | F04D 13/14 700/282 |

FOREIGN PATENT DOCUMENTS

| | | |
|---|---|---|
| EP | 0574241 B1 | 8/1998 |
| EP | 2476907 A1 | 7/2012 |
| JP | 2009-209523 A | 9/2009 |
| WO | 2008090359 A2 | 7/2008 |
| WO | 2010076558 A2 | 7/2010 |
| WO | 2012127783 A1 | 9/2012 |

OTHER PUBLICATIONS

Search Report dated Jul. 12, 2013 in EP Application No. 13158602.6.

* cited by examiner

PUMP SYSTEM

BACKGROUND OF THE INVENTION

The invention relates to a pump system for a water supply mains, as well as to a method for the regulation (closed-loop control) of a pump device in a water supply mains.

Water supply mains, for example, serve for the provision of water for complete towns or districts. As a rule, pumps are necessary in such water supply mains, in order to deliver the water to be distributed and to ensure a desired pressure in the water supply mains. For this, apart from delivery pumps, one can also apply booster pumps. The consumption fluctuates during the day in such water supply mains. Thereby, not only does the consumption as a whole fluctuate, but also in individual branches of the water supply mains. Inasmuch as this is concerned, it is difficult to always maintain a desired minimum pressure in all parts of the water supply mains, i.e., in all branches. For this, a control or regulation of the pumps building up the pressure in the water supply mains is necessary, in order to adapt their delivery output to the requirements.

BRIEF SUMMARY OF THE INVENTION

With regard to these problems, it is an object of the invention to provide a pump system for a water supply mains, having at least one pump device, as well as a method for the regulation of such a pump device, which in an improved manner permits the delivery output of a pump device to be adapted to the current requirements in the water supply mains, so that a desired minimum pressure with a minimal energy application is continuously ensured in all parts of the water supply mains.

The object is achieved by a pump system for a water supply mains having at least one pump device, a pressure sensor detecting the pressure at the pressure side of the pump device, a flow sensor detecting the flow of the pump device, several pressure sensor units provided for the remote arrangement from the pump device in different part regions of the water supply mains, and a control device for the control of the pump device, wherein the control device comprises a model formation module which is designed in each case to produce a model (A) representing the pressure loss from the pressure sensor to the position of the respective pressure sensor unit, on the basis of several pressure measured values of at least two pressure sensor units (D), for the at least two associated part regions, and the control device is designed for the regulation of the pump device on the basis of the produced models (A).

The object is also achieved by a method for regulating at least one pump device in a water supply mains, according to which the water supply mains is divided into several part regions and the pressure ($p_{cri}$) is detected in at least two part regions in each case at a critical point at several points in time, simultaneously the pressure ($p_{dis}$) at the exit side of the pump device is detected, a pressure loss for at least two of the part regions is determined on the basis of these pressure measured values, in each case a model (A) representing the pressure loss ($p_{pipe}$) is created on the basis of the determined pressure losses, for these at least two part regions, and the at least one pump device is regulated on the basis of the created models (A).

Preferred embodiments are to be deduced from the dependent claims, the subsequent description, as well as the attached drawings.

The pump system according to the invention serves for the delivery of water, in particular drinking water, in a water supply mains. Such a water supply mains can be a widely branched mains which, for example, supplies a town or one or more town districts with water. The pump system comprises at least one pump device which serves for delivery of the water in the water supply mains and/or bringing it to a desired pressure. With regard to the pump device, it can be the case of a pump assembly or the arrangement of several pump assemblies which together produce a desired pressure. In particular, it can be the case of booster pumps which serve for increasing the pressure.

Apart from the at least one pump device, the pump system according to the invention comprises at least one pressure sensor which detects the pressure at the pressure side, i.e., the exit side of the pump device. Such a pressure sensor, as the case may be, can be arranged directly at the exit side of the pump assembly or also be integrated into the pump assembly itself, in order to detect the pressure at the exit side. Moreover, at least one flow sensor is provided, which detects the flow of the pump device, i.e., the flow of the complete water supply mains supplied by the pump device. Such a flow sensor is also preferably arranged directly on the pump device, as the case may be, integrated into a pump assembly. Also each pump assembly can be provided with an individual flow sensor, in the case that several pumps connected in parallel are used, and these flows of the individual flow sensors can be added into a total flow. This arrangement of the several flow sensors then in the context of the invention can be seen as a flow sensor for detecting the flow of the pump device.

Instead of providing one or more pressure sensors or one or more flow sensors, it is also possible not for the pressure and/or flow to be directly measured, but to be derived from other detected or acquired variables, in particular electrical variables in the pump assembly. Such a system in the context of this invention is likewise to be seen as a pressure sensor or flow sensor.

Moreover, according to the invention, several pressure sensor units are envisaged, and these are provided for the remote arrangement from the pump device in different part regions of the water supply mains. The pressure sensor units are arranged at critical points of the water supply mains, in order to detect the pressure prevailing there. These pressure sensor units thus each comprise at least one pressure sensor for detecting the pressure in a part region of the water supply mains. Moreover, the pressure sensor units are usefully provided with communication means which permit a data transmission of the detected pressure values to a central control device. This central control device is preferably a control device which serves for the control of the pump device, i.e., controls or regulates (closed-loop controls) the pump device, in order to set a certain flow and/or exit pressure at the pressure side of the pump device. For this, the control device regulates or controls the control device, in particular the rotation speed of one or more pump assemblies.

The pressure sensor units are preferably provided with communication means which permit a wireless communication. That is, the pressure sensor units can comprise a radio module, in order to be able to transmit data over larger distances. The radio module can, for example, be designed for communication in a mobile radio network and permit the transmission of measured values or readings of the pressure sensor units, for example according to the SMS standard in the mobile radio network. Thus, for example, communication structures which are usually available everywhere can be used for the data transmission. However, it is also conceivable to provide other radio standards or a wire-connected communication. For this, the pressure sensor units could be provided with communication interfaces which, for example, are designed for data transmission via a cable-connected or other suitable data network.

According to the invention, the control device and the pressure sensor unit are however not linked such that a control or regulation is effected on the basis of pressure values currently detected by the pressure sensor units. Such a regulation in real time would necessitate a continuous data transmission from all pressure sensor units to the control device for the pump device, which would be quite complicated. In order to avoid this, according to the invention, the control device is provided with a model formation module which produces models for part-regions of the water supply mains, on which models the control or regulation of the pump device is then based. That is, according to the invention, the current regulation of the pump device is effected on the basis of models stored in the control device, so that no continuous communication with external greatly distanced sensors such as the pressure sensor units is necessary. The several pressure sensor units are preferably arranged close to the consumption locations at the critical points in the water supply mains which are distanced to the pump device and at which a desired minimal pressure is to be ensured and checked. According to the invention, the water supply mains is divided up into several part regions for the control of the pump device, wherein in each case at least one pressure sensor unit is assigned to different part regions which with regard to maintaining a minimal pressure value are to assessed as being critical, at a critical point in this part region. Thereby, the pressure sensor unit in the part region is preferably arranged at a critical point, as a rule at a point of the part region which is distanced to the pump device.

According to the invention, the model formation module is designed such that in each case, a single individual model can be created for individual part regions and only for this part region, to which regions at least one pressure sensor unit is assigned. For creating such a model, the model formation module is designed such it bases the model creation on several pressure measured values of a pressure sensor unit assigned to the respective part region. Thereby, it is preferably the case of pressure measured values which are detected or acquired at different, preferably defined points in time. Thereby, it may e.g. be the case of several pressure measured values distributed over the day. Thereby, usefully pressure measured values are recorded at precisely those points in time which are to be seen as being critical, i.e., points in time, at which the adherence of a desired minimum pressure in the respective part region is to be seen as being problematic. The model formation module is designed such that in this manner, it produces a representative model in each case for at least two part regions, wherein the model represents the pressure loss in the respective part region between the pressure sensor at the exit side of the pump device and the pressure sensor unit in this part region. The control device can then base the control or regulation of the pump device on this model, since the control device can deduce from the model, as to how the pressure loss in a respective part region will probably be in a certain operating condition of the water supply mains. The control device then on the basis of this and taking several, preferably all models of the different part regions into account, can control or regulate the central pump device such that the pressure loss in all part regions is adequately compensated, in order to be able to ensure preferably a desired minimal pressure in all part regions.

According to the invention, preferably the complete water supply mains is divided into different part regions and pressure sensor unit is assigned to each part region, and an individual model which represents the pressure loss from the central pump unit to the pressure sensor unit in the respective part region is produced for each of these part regions. The control or the regulation of the pump unit is then effected by the control device further preferably on the basis of all models. However, in the case that it is not the complete water supply mains which is divided into such part regions, it is however preferable at least for the critical parts of the water supply mains, in which a desired minimal pressure must be adhered to and is difficult to adhere to, for such part regions to be provided with individual models. Thus, according to the invention, always at least two part regions are provided with an associated model, on which the control and regulation of the pump device is based by the control device.

The described model creation is based on the recognition that with a water supply mains which consists of a multitude of very small consumers in comparison to the complete mains, the operating conditions of the complete mains are essentially constant, i.e., the operating conditions differ, for example, with regard to the time of day, but are essentially the same in a regularly recurring manner. This is particularly the case since the individual consumers have an essentially constant or regularly, for example daily recurring consumption profile. When considering part regions, with the model creation, it is moreover possible to adapt the models flexibly to changes which occur despite this.

Particularly preferably, the model formation module is designed in a manner such that the produced modules in each case represent the pressure loss from the pump device up to the position of the associated pressure sensor unit, in dependence on the time and/or the flow of the pump device. Thereby, one assumes that the pressure sensor detects the pressure at the exit side of the pump device, i.e., the model indeed represents the pressure loss between the pressure sensor and the pressure sensor unit. The time thereby can, for example, represent a daily course, so that, for example, it is evident by way of such a model, as to which times of the day a certain pressure loss is to be expected in the part region of the water supply mains which is represented by the model. Moreover, the model is preferably produced such that it alternatively or additionally represents the pressure loss over the flow. Thus, the expected pressure loss in the part region belonging to the model can be read off from the model, for different flows. The pump device can then be accordingly regulated or controlled by the control device on the basis of this data which the control device later takes from the individual models for regulation of the pump device, in order to ensure a desired minimum pressure in all part regions. Thereby, this minimal pressure does not have to be the same in all part regions, and in contrast, an individual minimum pressure can be defined in the control device for each part region.

Preferably, the control device is designed in a manner such that it regulates the pump device to a defined desired pressure, wherein the control device comprises a desired pressure evaluation module which is designed to determine this desired pressure depending on the time and/or the flow of the pump device on the basis of the previously created modules representing the pressure loss. That is, the desired pressure evaluation module preferably has a memory, from which desired minimal pressure values for the individual part regions can be taken. Subsequently, the desired pressure evaluation module then while taking into account, for example, the current time of day and/or the current flow, can deduce the occurring pressure loss to be expected at these operating conditions or at this point in time, from the individual models of the part regions, and from this can then determine which desired pressure must prevail at the exit side of the pump device, in order to compensate the occurring pressure losses and to ensure the desired minimal pressures in the individual part regions.

For this, the desired pressure evaluation module is preferably designed in a manner such that it determines a desired pressure for the pump device in a manner such that for each of the part regions of the water supply mains, the desired minimal pressure is added to the pressure loss determined from the associated model, into a summed pressure value, and the greatest summed pressure value determined in this manner is applied as a desired pressure. That is, based on a desired minimal pressure which is stored in a memory of the desired pressure evaluation module or a memory which can be accessed by the desired pressure evaluation module, and while utilizing the respective model for each part region of the water supply mains, firstly a summed pressure value is determined, which corresponds to the desired pressure at the exit side of the pump device, the desired pressure having to be achieved, in order to be able to compensate the pressure loss in the respective part region and to ensure the desired minimal pressure. If then such a summed pressure value is formed for each part region, and the highest summed pressure value is selected from these as a desired value, to which the pump device then regulates or controls with a closed loop, it is ensured that at least the desired minimal pressure is achieved in each of the part regions. As the case may be, a greater end pressure is reached in a few part regions.

The desired pressure evaluation module preferably serves for generating a regulating curve or closed-loop control curve, according to which the pump assembly or assemblies are then regulated. This, as previously described, can be effected as a definition of individual desired pressure values in dependence on the flow. Thus, in practice, a regulating curve which describes the dependency of the pressure on the flow, is generated by the desired pressure evaluation module. The desired pressure evaluation module thereby forms a regulating curve evaluation module.

The model formation module is preferably designed in a manner such that in temporal intervals, it updates the formed models on the basis of newer pressure values provided by the pressure sensor units. Thus, for example, an updating of the models can be carried out daily. Moreover, due to the fact that individual models are created for individual part regions, a very flexible updating is possible, since it is always only individual part models which need to be updated. Moreover, the division of the water supply mains into individual part regions with individual part models permits an altogether more accurate and flexible regulation, since firstly each model of a part region is considered independently and then only at the end after considering all models, as previously described, is the pressure which must prevail at the exit side of the pump device, in order to be in accordance with all models or all expected pressure losses, determined by the desired pressure evaluation module. One can react to changes of the expected pressure losses in the individual part regions or to a control element in a significantly more flexible manner in this way.

The described model formation module and the described desired pressure evaluation module can in each case preferably be designed as software modules within the control device. They can also be integrated together into a software application.

According to a preferred embodiment, the pressure sensor units are provided in each case with a measured value memory which is suitable for storing several pressure measured values in each case with a time stamp. The communication between the pressure sensor units and the control device or the model formation module can be simplified by way of such a measured value memory. Thus, specifically the pressure sensor units can store several pressure measured values over a certain time period and then transmit all pressure measured values together to the control device in one transmission procedure. The control device is provided with a communication module which corresponds with the pressure sensor units, for example, provided with a radio interface which can communicate with a conventional mobile communications network. The pressure sensor units can be designed such that they automatically initiate a data transmission of to the control device, but also designed such that the data is called up by the control device at certain points in time. Preferably, the measured value memory is designed such that it can store the data of a complete day, so that data is transmitted from the pressure sensor unit to the control device only once per day. As soon as the control device has received the data, its model formation module can then create a corresponding model for the associated part region or update it, as the case may be, on the basis of the newer measured values of the pressure sensor unit. In order to design a model as accurately as possible, the pressure sensor units are further preferably deigned such that they detect pressure values over the whole day, in particularly in a uniformly distributed manner. Thus, for example, pressure measurements can be carried out every hour or every half hour. Each measurement is preferably provided with a time stamp, so that after a later data transmission, in the control unit, one can precisely detect which pressure value was detected by the pressure measurement unit at which point in time.

As described, each pressure sensor unit is equipped with a suitable communication module which is suitable for communication with the control device provided with a corresponding communication module for this. The communication modules have suitable interfaces for the data transmission, for example according to a public mobile radio standard or data mains standard.

According to a preferred embodiment of the invention, the control device can be part of a pump device and in particular of a pump assembly. Thus, the control device can be integrated into a pump assembly, for example, accommodated in an electronics housing arranged directly on the pump assembly. It is also possible in the case that the pump device comprises several pump assemblies, for the control device to be integrated into one of the pump assemblies and to simultaneously control or regulate the further pump assemblies.

According to a further preferred embodiment of the invention, the control device comprises a leakage detection module. Such a module can also be realized as a software module in the control device. The leakage detection module is preferably designed in a manner such that via the flow sensor, it detects or acquires the flow at a recurring defined point in time or in a recurring predefined time span, preferably daily, and compares the detected flow with a limit value and/or with one or more flows detected at preceding points in time or time spans. With regard to the recurring point in time, it can for example be the case a certain daily time, so that the flow is detected or acquired every day at this time. Thereby, the flow can be determined at precisely this point in time, or for example, the flow can be detected in a defined time span and an average formed. Preferably, the recurring point in time is at night, since the flow in a water supply mains is usually very low at this point in time. Changes of the flows which can indicate a leakage can be detected by way of the comparison of the thus detected flow with limit values and/or flows detected previously at corresponding points in time or in corresponding time spans. If for example, the current flow is detected by the leakage detection module in a daily manner at a certain time, then the flow statistically should be essentially the same over several days. If however a continuous increase occurs over several days, or, as the case may be, a sudden increase occurs which differs from the longer term average, then one can, for example, conclude a leakage from this. One can also set limit values in the control device as the case may be, and a leakage assumed when these are exceeded.

Further preferably, the control device comprises a leakage detection module which is designed in a manner such that for determining the probable location of a leakage, it determines an actual pressure loss in each case for the individual part regions, on the basis of measured values (readings) of the pressure sensor as well as of the respective pressure sensor unit belonging to the respective part region, and compares this actual pressure loss with an expected pressure loss derived from the associated model. Thus, the division of the complete mains into individual part regions with associated models for the pressure loss can be used to localize a leakage or to localize the probable location of the leakage to at least one of the part regions. This can be effected by way of the comparison of the pressure loss in the respective part region and which is actually detected at a certain point in time, with the expected pressure loss at this point in time, the expected pressure loss resulting from the associated model. For example, a large difference from the model is an indication that a pressure loss has occurred in this part region.

The leakage detection module is further preferably designed in a manner such that it indicates a probable leakage for that part region, for which the actual pressure loss is the same as or larger than the expected pressure loss. Preferably, the leakage detection module is designed such that it always takes into account all models or all part regions. With a leakage in one of the part regions, according to expectations, the pressure loss will increase only in this part region, while it changes very little or decreases in the other part regions.

Particularly preferably, the leakage detection module is designed such that a leakage is detected in the following two steps. In a first step, as previously described, by way of a comparison of the flows, one firstly detects as to whether a leakage in the complete mains is probable. Should such a probability be ascertained by the leakage detection module in the previously described manner, then a localization amid the aid of the models for the individual part regions is carried out as has been described previously, in the second step. Thus, a probable leakage is ascertained due to an increase in the flow, and in a second step it is ascertained that the pressure loss in one of the part regions has increased compared to the model, so that it is probable than a leakage is given in this part region.

According to a further preferred embodiment, the control device comprises a leakage detection module which is designed in a manner such that for the individual part regions, with an updating of the associated model, for the expected pressure drop in this part region by way of the model formation module, it compares the expected pressure drop for one or more certain operating conditions according to an updated model with the expected pressure drop according to a previous model, and recognizes a probable leakage in the associated part region on the basis of a change of the expected pressure drop. That is, according to this method for the localization of the leakage in one of the part regions, a current measurement of the pressure drop is not compared to an expected value for the pressure drop the expected value being derived from an existing model, but the values resulting from the models are compared to one another and specifically for an a older module and for an updated model. The updated model will change due to the leakage, i.e., the updated model can expect a greater pressure drop than was the case in an older model, since possibly occurring leakages are incorporated into the update. This change can be used for the detection and in particular localization of a leakage. This comparison is usefully carried out for all part regions on the basis of the models applicable to these. If a change is then ascertained in only one part region, then it is probable that a leakage is given there.

The subject matter of the invention is moreover a corresponding method for the regulation of a pump device. Such a method in particular can be realized with a pump system as has been previously described. Inasmuch as this is concerned, with regard to preferred method features, the preceding description of the course of the method by way of the pump system is also referred to.

The method according to the invention serves for the regulation of at least one pump device in a water supply mains. The pump device and the water supply mains can thereby be designed in the manner described above by way of the pump system. According to the invention, for the regulation, the water supply mains is divided into several part regions which in a certain scope are considered separately for the pressure regulation. In at least two such part regions, the pressure is acquired in each case at least one critical point at several points in time. The pressure is simultaneously detected at the exit side of the pump device. Thus, on the basis of these pressure measured values, the pressure loss is determined for at least two of the part regions at different points in time, as which the pressure in the part regions and simultaneously the pressure at the exit side of the pump device was measured. Thus, pressure losses for the individual part regions at certain points in time and at certain operating conditions which prevail at the points in time, at which the pressure losses were measured, are acquired. In each case, a model representing the pressure loss is created on the basis of these data, in particular the determined pressure losses, for the mentioned at least two part regions. The model indicates an expected pressure loss for certain operating conditions, in particular for certain points in time and/or flows. The pump device according to the invention is subsequently regulated on the basis of the created models. That is, with the control or regulation of the pump device, it is not the current actually measured pressure values in the water supply mains at all critical points which are taken into account, but instead one falls back on the previously created models. This has the advantage that constant continuous pressure measurements with feedbacks to the control of the pump device are not required at all critical points of the water supply mains.

Preferably, the flow of the pump device, i.e., the total flow for the water supply mains is determined simultaneously with the detection of the pressure at the mentioned critical points of the part regions, and the models are thus created such that they represent the pressure loss in the associated part region, in dependence on the time and/or the flow. Thereby, the model represents the dependency on the flow of the complete mains, i.e., it is not necessary to detect the flow for the individual part regions, so that pressure measurements only need to be carried out in these at the critical points. An expected pressure loss can be determined, for example, by way of the current, measured flow and the time, and the starting point of the pump device can be set on the basis of this pressure loss, for the regulation or control of the pump device.

Preferably, for the regulation of the pump device, the current, which is to say presently occurring flow of the pump device is detected and the pressure losses to be expected in all part regions is determined for the current point in time and the currently detected flow by way of the previously created models, and subsequently an exit pressure of the pump device is regulated to a desired pressure which compensates these pressure losses. Thus, as described above, the expected pressure losses can be added to the predefined minimal pressures for the individual part regions, and then the desired pressure for the regulation of the pump device can be based on the greatest pressure value from these added pressure values. That is, the exit pressure of the pump device is preferably set such that the greatest occurring pressure loss in one of the part regions can just about be compensated.

According to a further preferred development of the method, the pressure at the critical points in the individual part regions are detected at several points in time and these measured values are stored and an evaluation for creating or updating the associated model is effected after a certain number of measurements or a certain time span. The data transmission can be optimized or simplified in this manner since a data set does not have to be transmitted directly from the critical point, at which the measurement is effected, to a central control device for each measurement. Instead, firstly many measured values can be collected and then be transmitted together, so that a data transmission once per day is sufficient, for example.

Further preferably, with the method, a leakage can be detected by way of the flow of the pump device being detected at a certain point in time or in a certain time span in a regular, preferably daily manner in the water supply mains, and the thus acquired flow measured values being compared amongst one another or with at least one predefined limit value. Thus, for example, the flow can be detected daily at a certain time, in particular at night, and these detected flow values can be compared over several days. If an excessive increase in the flow measured values at the repeating points in time occurs, then this can be an indication of a leakage. A leakage can also be deduced when exceeding a certain limit value for the flow.

According to a further preferred development of the method, it is likewise possible to localize a probable location of a leakage in the water supply mains at least to one of the part regions. This is preferably effected by way of the comparison of a pressure loss actually measured for a part region, with the pressure loss to be expected according to the associated model for this part region. Thereby, preferably a leakage is then ascertained in a part region, if in this, the actual pressure loss is equal or greater than the expected pressure loss. This is particularly the case if the actual pressure loss in all other part regions corresponds to the expected pressure loss or however is smaller than the expected pressure loss. Inasmuch as this is concerned, the division of the complete mains into different part regions with individual models for the pressure loss of these part regions has the advantage that these models, apart from the regulation or control of the pump unit, can be simultaneously used for recognizing and localizing a leakage. The probable of a leakage in the water supply mains can thus preferably be effected by the comparison of an average pressure loss measured in a defined time interval for a part region, with the pressure loss which is to be expected according to the associated model for this part region in the same time interval, wherein preferably then a leakage is ascertained in a part region if in this, the measured, average pressure loss is equal or larger than the average pressure loss to be expected. That is, according to this variant of the method, it is not the current pressure loss which is considered, but one considers a longer time interval, in which the average for the pressure loss is formed. Then the average pressure loss for the same time interval is read out in the model and these two average values are compared with one another. A greater accuracy of recognition can be realized in this manner since temporally limited deviations can be disregarded.

Alternatively, or additionally, the location of a leakage in the water supply mains can be determined by way of the comparison of the expected pressure loss in a part region for one or more operating condition according to a first model, with the expected pressure loss for the same operating conditions of the same part region according to a second, updated model. That is, the updated model can be compared to the model of the previous day, for example if a model for a part region is updated daily. If for example, the expected pressure loss for one or more certain points in time, time intervals or operating conditions in the new model is greater than in the model of the previous day, then this can indicate a leakage. In particular, here one can also compare models over several days or over a longer time interval with one another, in order to release a greater recognition accuracy.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
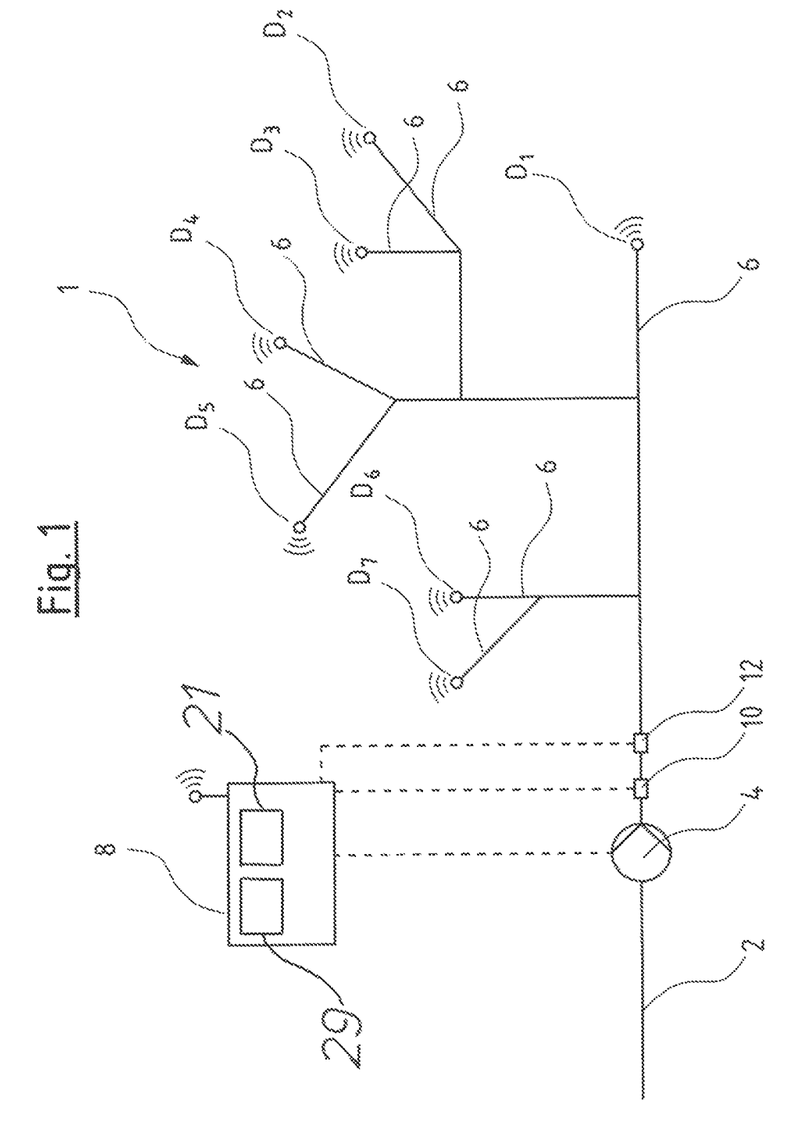
FIG. 1 is a schematic diagram of a water supply mains having a pump system according to an embodiment of the invention.

FIG. 1 schematically shows a water supply mains having a pump system according to an embodiment of the invention. The water supply mains comprises a feed conduit 2, in which a pump unit 4, for example one or more pump assemblies, is arranged. The water supply mains branches into several branches 6 downstream of the pump unit 4. Pressure sensor units D(D$_1$ ... D$_n$) are arranged in the shown individual branches 6 at critical points. In the example shown here, the pressure sensor units D are equipped with radio communication modules, which permit a data transmission, via a mobile network according to the SMS standard, to a control device 8. The pressure sensor units D moreover comprise measured value memories, in which pressure measured values with a time stamp and stored at different points in time are stored, so that the individual pressure measured values can be assigned to exact points in time at which they were acquired. The pressure sensor units D are designed such that they transmit the stored pressure measured values by radio to the control device 8 once daily. The pressure sensor units D measure the pressure value at the critical points, for example every half hour, distributed over the day. More or fewer pressure measurements can also be effected. The number of pressure measurements should be selected such that, where possible, all critical operating conditions can be sufficiently accurately acquired over the day.

The control device 8 serves for the control or regulation of the pump unit 4. In particular, the control device 8 regulates, which is to say controls with a closed loop, one or more pump assemblies of the pump unit 4 with regard to the speed, such that a desired exit pressure at the pressure side of the pump unit 4 is achieved. This is detected by a pressure sensor 10. Moreover, a flow sensor 12 is arranged in front of the branching, so that it centrally detects the flow through the pump unit 4 and thus through the complete water supply mains situated downstream. The pressure sensor 10 and the flow meter 12 deliver their measured values or readings to the control device 8, wherein these preferably permit a continuous measurement. The pressure sensor 10 and the flow sensor 12 are preferably arranged in the vicinity of the control device 8 so that a lead connection can be provided here for the data transmission.

Figure 2:
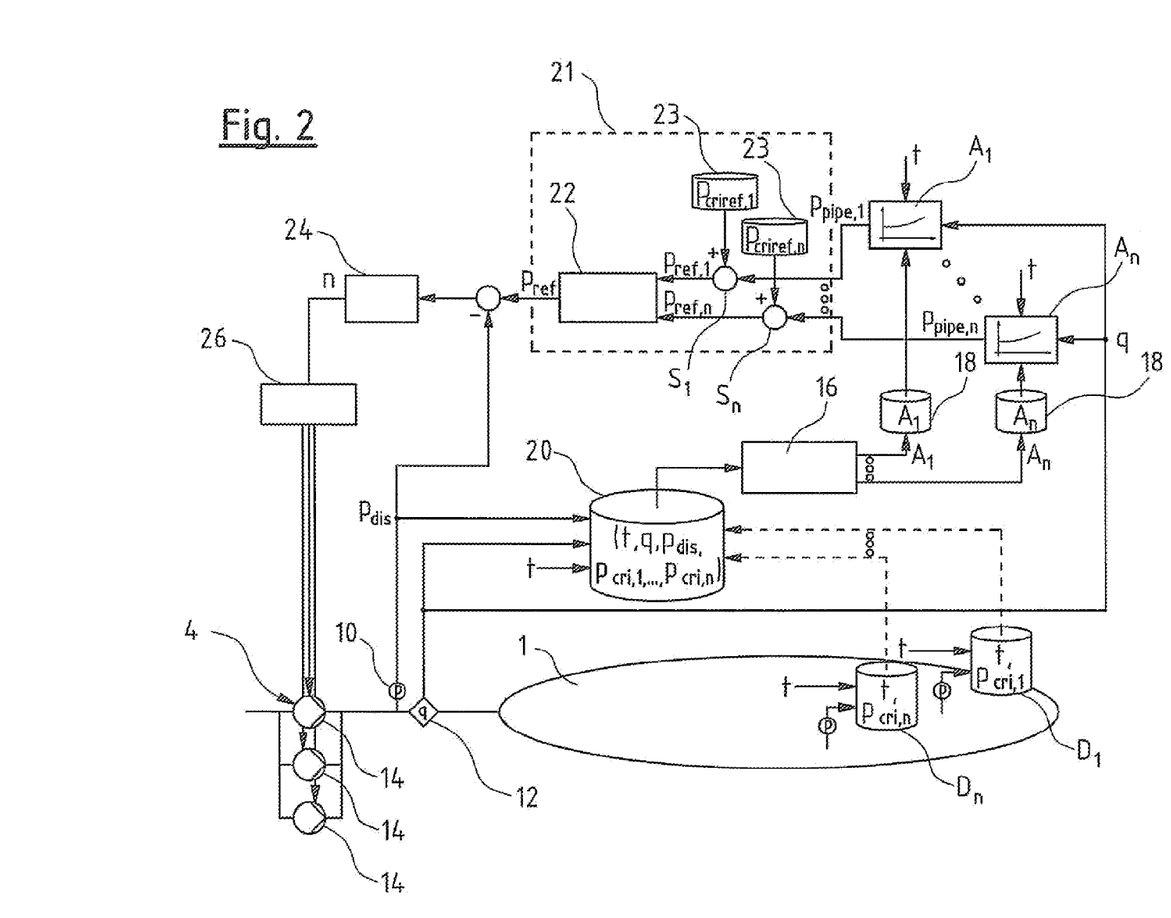
FIG. 2 is a schematic diagram showing the function of a pump system according to an embodiment of the invention.

The regulation or control of the pump unit 4, according to the invention, is described in more detail by way of FIG. 2. In the example shown in FIG. 2, several pump assemblies 14 are shown as a pump unit, and these can be operated parallel or in an alternating manner, depending on which delivery power is desired. The pump unit 4 thus forms a pump station, which has one or more pump assemblies 14 for the pressure increase of the water. The control is effected on the basis of several models A(A$_1$ ... A$_n$) which represent the pressure loss in individual part regions of the water supply mains 1. According to the invention, in each case an associated model A for the pressure loss between the pressure sensor 10 and the respective pressure sensor unit D is created for several pressure sensor units D, in this example for all pressure sensor units D. Thus, different models A for the individual critical points in different branches 6 of the water supply mains 1 are produced, and these represent the pressure loss in these part regions of the water supply mains, depending on the time t and the flow q in the entire water supply mains 1, the flow being detected by the flow sensor 12.

The models A are formed on the basis of the pressure values p$_{cri}$(p$_{cri, 1}$ ... p$_{cri, n}$) detected by the pressure sensor units D at different points in time. The pressure sensor units D detect the pressure value at several points in time, for example every half hour as described above. These detected values are led to the control device 8 in a regular manner, for example once per day. There, pressure measured values of the pressure sensor 10, the flow measured values of the flow sensor 12, as well as the associated time are acquired as further data. The models A(A$_1$ ... A$_n$) are formed in the model formation module 16 on the basis of these data. The models A are stored in parameter memories 18 in the control device 8 for all part regions. Every time when newly acquired measured values are sent to the control device 8 from the pressure sensor units D, these are again processed in the model formation module 16 with the detected pressure measured values form the pressure sensor 10 and the flow measured values from the flow sensor 12, and the produced models A are updated. With the processing in the module formation module 16, thereby a temporal assignment of all measured values at individual points in time is carried out, i.e., a pressure measured value p$_{cri}$, a pressure measured value p$_{dis}$ of the pressure sensor 10, as well as a flow measured value q of the flow sensor 12 is assigned to each considered point in time. This assignment forms the model A and is stored in the memory 18 in an updated manner. Each of the models A thus indicates a pressure loss which is to be expected at a certain point in time at a certain flow q in the complete network, in the individual part region. Thereby, the structure of each of these models is given, for example, by:

$$p_{dis} - p_{cri} = a_0 + q^2(a_1 + a_2 \cos(\omega t) + a_3 \sin(\omega t) + a_4 \cos(2\omega t) + a_5 \sin(2\omega t) + a_6 \cos(3\omega t) + a_7 \sin(3\omega t))$$

p$_{dis}$ thereby corresponds to the pressure at the pressure sensor 10, p$_{cri}$ corresponds to the pressure at the pressure sensor unit D, q is the flow at the flow sensor 12. The parameters a(a$_0$, ... a$_7$) are produced in the model formation module 16 on the basis of the acquired measured values. The fixed parameter $\omega$ indicates the frequency of the daily variations in the model.

Preferably, data of only one day are taken into account for model formation, so that the measured readings over only one day need to be stored by the pressure sensor units D, as well as in a data memory 20 of the control device 8. The data volume to be processed is thus kept small.

The regulation of the pump unit 4 is effected on the basis of the currently measured flow q and the time t in a manner such that the pressure loses p$_{pipe}$(p$_{pipe, 1}$ ... p$_{pipe, n}$) to be expected for this flow and at this point in time can be read out from the thus formed models A. The desired pressure which is necessary at the exit side of the pump assembly 14 is determined in a desired pressure evaluation module 21 which comprises a adders S(S$_1$ ... S$_n$),desired pressure memories 23 as well as a comparator 22. The pressure losses p$_{pipe}$ to be expected are in each case added to an associated minimal pressure or reference pressure P$_{criref}$ which is read out from the respective desired pressure memory 23 and which is to be achieved in each case at the critical points, at which the pressure sensor units D are arranged. This is effected in the addition steps S(S$_1$, ... S$_n$) in the control device 8. There, the respective reference pressures p$_{criref}$(p$_{criref, 1}$ ... p$_{criref,n}$) are added to the determined pressure losses p$_{pipe}$ to be expected. The reference pressures p$_{ref}$ (p$_{ref, 1}$ ... p$_{ref,n}$) to be achieved for the individual part regions are determined from these additions. These are then compared to one another in a comparator 22, and the greatest determined reference pressure $_{pref}$ is led to the speed controller or speed regulation module 24 in the control device 8. A regulation or closed-loop control to the desired pressure $_{pref}$ takes place in this control device, while taking into account the pressure p$_{dis}$ currently detected by the pressure senor 10. The speed controller 24 issues the rotational speed n for the pump assembly or assemblies 14. Additionally, the control device 8 in this example comprises a selection module 26 which ascertains whether one or more pump assemblies 14 are used and with which speed n they are driven and, if not all pump assemblies 14 are used, which of the pump assemblies 14 are applied. Thus, a uniform utilization of the several pump assemblies 14 can be achieved by the selection module 26.

The use of the models for the individual part regions of the water supply mains 1 which correspond in each case to one or more branches 6, in which in each case a pressure sensor unit D is arranged, has the advantage that the actual exit pressure of the pump unit 6 can be adapted very precisely to the actual requirements, and thus an adequate pressure in the individual part regions is always ensured and simultaneously the energy application can be minimized. Moreover, the individual part models A can be adapted flexibly to the changes of the requirement in the water supply mains 1 via the data acquired by the pressure sensor units D.

With the embodiment example according to FIG. 2, it is to be understood that infinitely many part regions with pressure sensor units D and accordingly infinitely many models A can be present. The signal processing and the evaluation of the reference pressure $P_{ref}$ for the individual part regions is effected in each case independently, so that a corresponding number of adders S and desired pressure memories 23 as well as memories 18 is provided, which is indicated in each case by the three points between the signal lines in FIG. 2.

Figure 3:
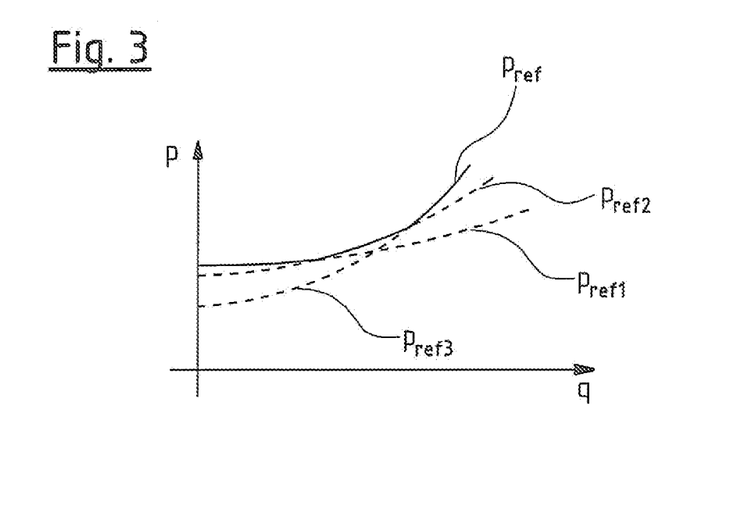
FIG. 3 is a p-q diagram in which the desired pressure is plotted for different flows.

FIG. 3 shows a pq-diagram, in which the pressures is plotted over the flow. One can recognize that it is always the highest summed pressure value $p_{ref}$ for the respective flow which is selected as a reference pressure $p_{ref}$, to which the pump unit 4 is regulated. The reference pressure $p_{ref}$, to which the pump unit 4 regulates is characterized by the unbroken line.

Figure 4:
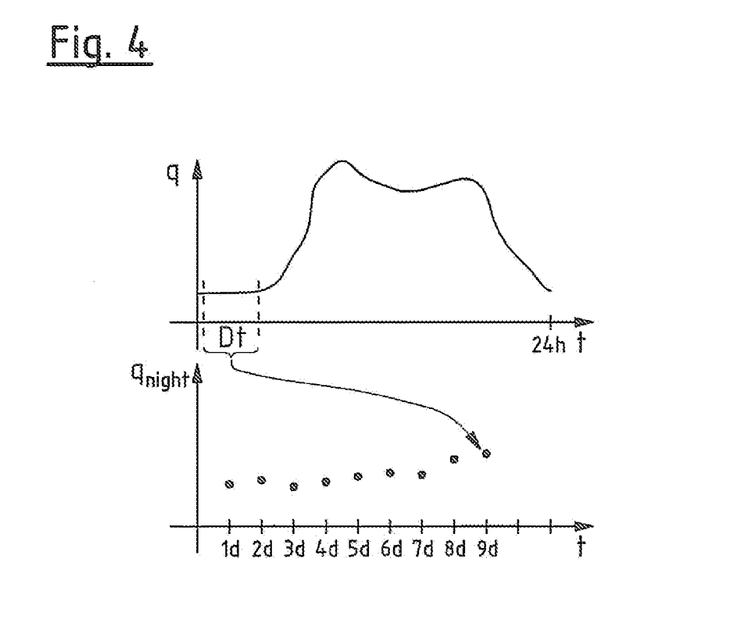
FIG. 4 is two diagrams depicting nocturnal flow measurements for detecting mains leakage.

The control device 8 of the pump system according to the invention moreover permits possible leakages in the water supply mains 1 to be detected and localized. For this, an average flow value at the flow sensor 12 is detected by the control device 8 daily in a defined time interval Dt beginning at a certain point in time which is always recurring (see FIG. 4). This is preferably effected at night, for example midnight, when the flow is the least and is largely constant over several days. This flow Dt is stored over several days and compared, as is plotted in the diagram below in FIG. 4 for the days 1d to 9d. One can conclude a leakage at a location of the water supply mains 1 from the rise of the flow which is recognizable here, beginning on day 4d up to day 9d. When the control device 8 recognizes such an increase over several days or alternatively or additionally the exceeding of a predefined limit value, then a leakage is concluded from this, and this is signaled in a suitable fashion as the case may be.

Figure 5:
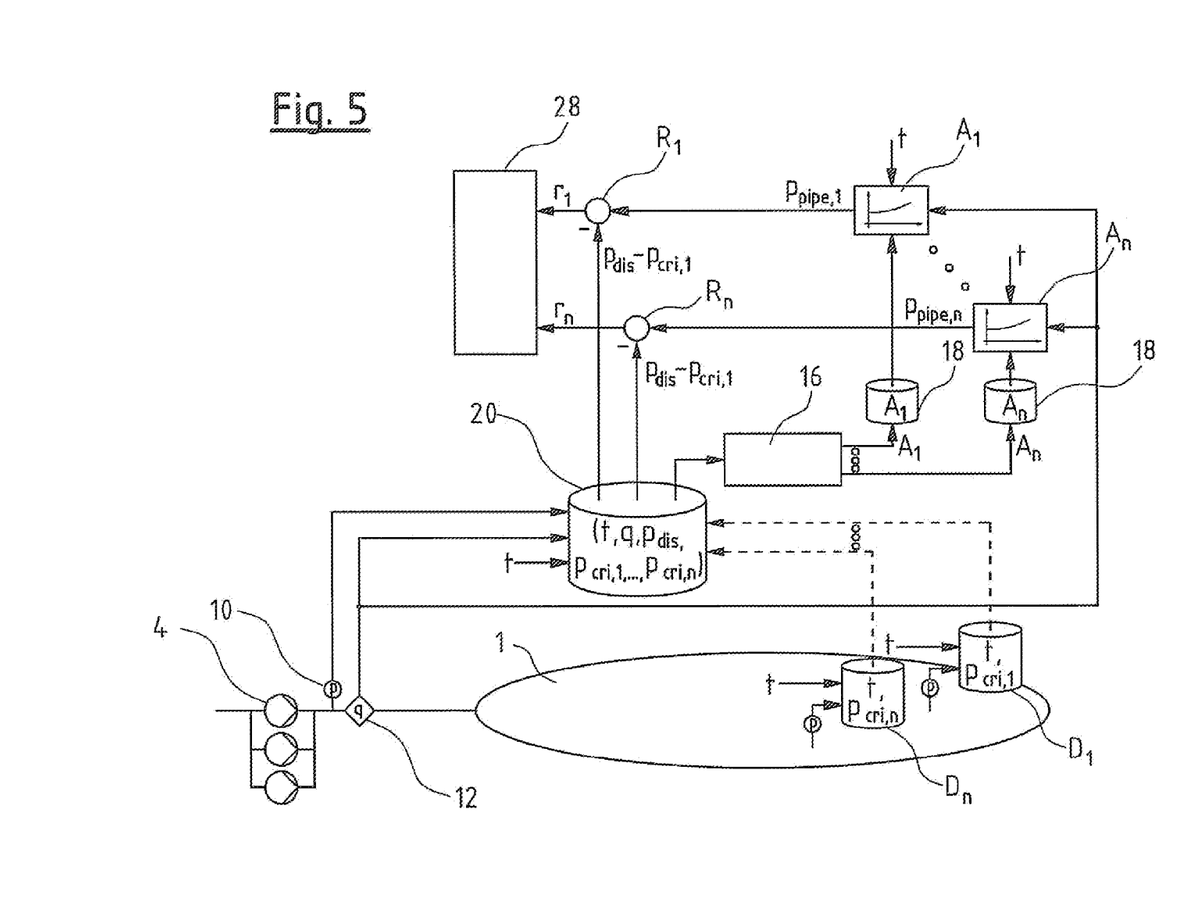
FIG. 5 is a schematic diagram showing the localization of a leakage according to a first embodiment of the invention.

It is then possible in a next step to localize in which of the part regions, which are assigned to the pressure measurement units D, the leakage is probably situated, by way of the formed models A. For this, a first method is described by way of FIG. 5. A suitable program module, specifically a leakage detection module 29 (FIG. 1) can be present in the control device 8, for carrying out this method. For leakage recognition, the exit pressure $p_{dis}$ of the pump unit 4 is considered at a certain point in time t, as well as the pressure $p_{cri}$($p_{cri\,1}$ ... $p_{cri,\,n}$) detected by the respective pressure sensor units d at this point in time. The difference $p_{dis}-p_{cri,n}$, i.e., the actual pressure loss at a certain point in time t, is formed from these. These values R($R_1$ ... $R_n$) in a residual value formation step in each case separately for each part region, i.e., separately for each model A($A_1$ ... $A_n$), are subtracted from the expected pressure losses according to the models A at the respective points in time and flows, i.e., the pressure losses $P_{pipe}$ ($P_{pipe,\,1}$ ... $P_{pipe,n}$). In this manner, the residual values r($r_1$ ... $r_n$) are formed for the individual part regions. Then, in a localization module 28 or localization step 28, in a next step, one considers as to which of the residual values r is larger, which is the same and which is smaller than 0. The probability of a leak is then localized in that part region, in which the residual value r is equal or smaller than 0. That is, it is assumed that a leak occurs where the pressure loss is greater than expected. In the other part regions of the water supply mains, the pressure due to the simultaneously reducing flow would in return increase, so that there the residual value r is greater than 0. This means that the probability of a leakage is greatest where the residual value is 0 or smaller than 0. The influence of fluctuations due to the water consumption when considering this is eliminated, due to the fact that it is only the polarity of the residual values and not the actual value which is considered.

Figure 6:
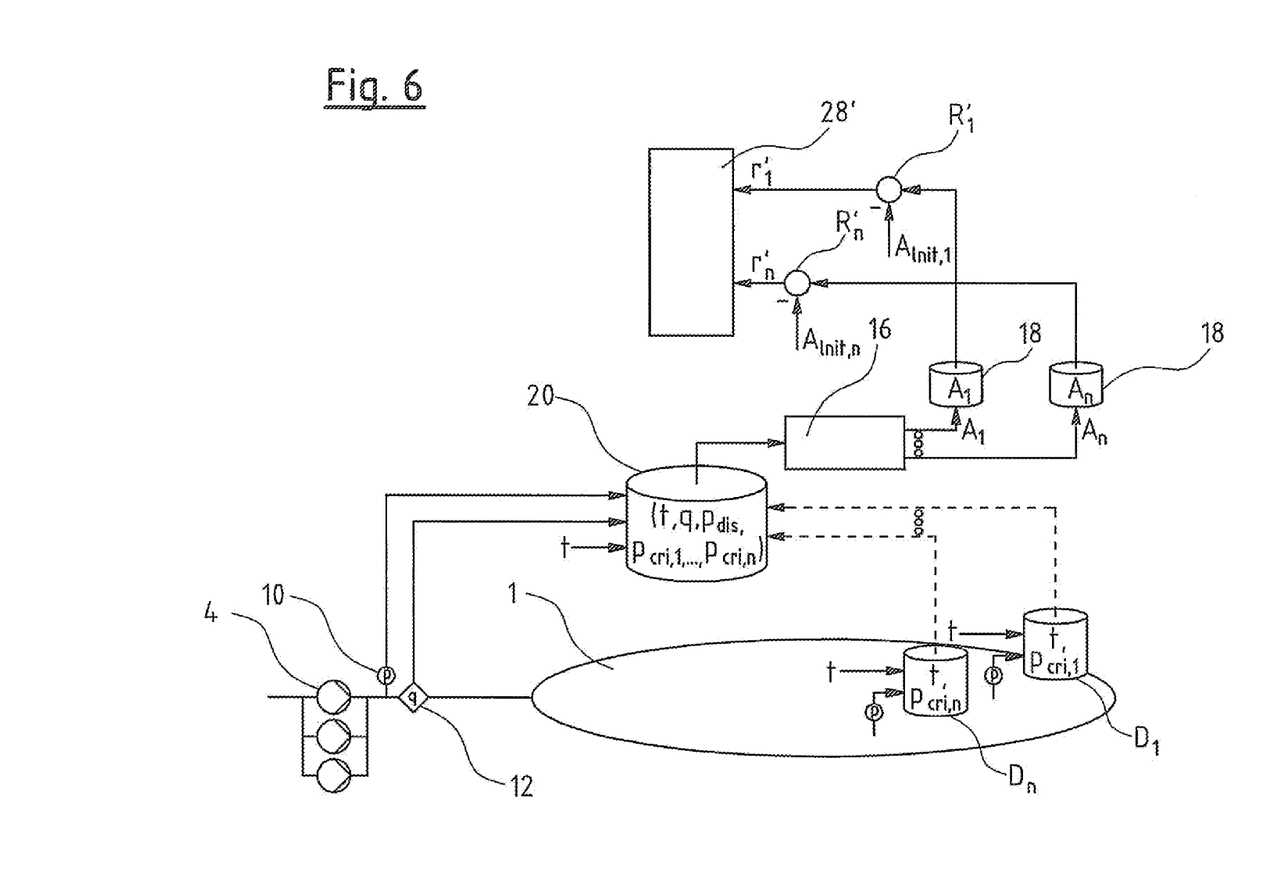
FIG. 6 is a schematic diagram showing the localization of a leakage according to a second embodiment of the invention.

A second method for localizing leakages is described by way of FIG. 6. This method differs from the previous method described by way of FIG. 5, due to the fact that no residual value between the expected pressure loss and the actual pressure loss is formed in the residual value formation steps R'($R'_1$ ... $R'_n$), but the parameters of the current models A are compared with parameters of the valid models $A_{Init}$ ($A_{Init,\,1}$ ... $A_{Init,\,n}$). That is, after the updating of a model A on account of new measured values from the pressure sensor units D, the thus produced model A is compared with the respective model $A_{Init}$ for the same part region which was previously applicable or valid. That is, the parameters of the one model in the residual value formation steps R' are subtracted from the associated parameters of the other model. Thereby, the parameters, i.e., the pressure loss values for the same operating condition, i.e., the same points in time and flows are taken into account. The thus formed residual values r'($r'_1$ ... $r'_n$) are compared with one another in the localization module 28'. Thereby, it is analyzed in the localization module 28' as for which of the part regions the parameters of the model A have changed. Thereby, not only the parameters in the part region, in which the leakage is situated will change, but the parameters a according to the above formula and representing the pressure loss will positively change in the part region in which the leakage is situated, whereas they change negatively in the part regions in which no leak occurs. That is, the parameters of the model A which represent the pressure loss increase for the part region in which a leakage is present, while they reduce for the other part regions. This is analyzed in the localization module 28', so that then the part region in which the leakage has occurred can be determined according to the model A($A_1$ ... $A_n$).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A pump system for a water supply mains, the system comprising:
    at least one pump device;
    a pressure sensor configured to detect pressure at a pressure side of the pump device;
    a flow sensor configured to detect a flow of the pump device;
    a plurality of pressure sensor units (D) arranged remotely from the pump device in different part regions of the water supply mains; and
    a control device for control of the pump device, the control device comprising a model formation module configured to produce, based on measured pressure values from at least two of the plurality of pressure sensor units from corresponding part regions, models (A), each model representing an expected pressure loss between the pressure sensor and a position of a respective one of the at least two pressure sensor units (D) as a function of time and flow of the pump device, the control device being configured to regulate the pump device based on all of the produced models (A) by applying a currently measured flow (q) of the pump device and time (t) to each of the models (A).

2. The pump system according to claim 1, wherein the control device is designed to regulate the pump device to a predefined desired pressure, and wherein the control device comprises a desired pressure evaluation module designed to determine the desired pressure ($p_{ref}$) in a manner depending on the time (t) and currently measured flow (q) of the pump device, based on previously created models (A) representing the pressure losses.

3. The pump system according to claim 2, wherein the desired pressure evaluation model is designed to determine the desired pressure ($p_{ref}$) for the pump device such that a desired minimal pressure is added to the pressure loss determined from the respective model (A), resulting in a summed pressure value for each of the part regions of the water supply mains, and the largest of the summed pressure values determined in this manner is selected as the desired pressure ($p_{ref}$).

4. The pump system according to claim 1, wherein the model formation module is designed to update the produced models (A) based on newer pressure values provided by the pressure sensor units (D) in temporal intervals.

5. The pump system according to claim 1, wherein the pressure sensor units (D) are provided respectively with a measured value memory suitable for storing a plurality of pressure measured values, in each case with a time stamp.

6. The pump system according to claim 1, wherein the pressure sensor units (D) are provided respectively with a communication module suitable for communication with the control device.

7. The pump system according to claim 1, wherein the control device is part of the pump device or a pump assembly.

8. The pump system according to claim 1, wherein the control device further comprises a leakage detection module designed to detect, via the flow sensor, the flow (q) at a recurring predefined point in time or in a recurring time span, optionally daily, and to compare the thus-acquired flow (q) to a limit value and/or to at least one flow detected in preceding points in time or time spans.

9. The pump system according to claim 1, wherein the control device further comprises a leakage detection module designed to determine a probable location of a leakage by determining in each case an actual pressure loss based on measured values of the pressure sensor and the respective pressure sensor units (D) for the respective part regions, and by comparing the actual pressure loss with an expected pressure loss derived from the respective model (A).

10. The pump system according to claim 9, wherein the leakage detection module is designed to indicate a probable leakage for that part region for which the actual pressure loss is equal to or greater than the expected pressure loss.

11. The pump system according to claim 1, wherein the control device further comprises a leakage detection module designed such that for the respective part regions, with an updating of the respective model (A) for an expected pressure drop in this part region by the model formation module, the leakage detection module compares the expected pressure drop for a certain operating condition according to an updated model (A) with the expected pressure drop according to a previous model ($A_{Init}$) and recognizes a probable leakage in the respective part region based on a change of the expected pressure drop.

* * * * *